United States Patent
Arora et al.

(10) Patent No.: US 12,450,134 B2
(45) Date of Patent: Oct. 21, 2025

(54) MULTI-COMPUTER SYSTEM FOR MAINTAINING APPLICATION PROGRAMMING INTERFACE STABILITY WITH SHARED COMPUTING INFRASTRUCTURE

(71) Applicant: Bank of America Corporation, Charlotte, NC (US)

(72) Inventors: Saurabh Arora, Gurugram (IN); Sandeep Kumar Chauhan, Miyapur (IN)

(73) Assignee: Bank of America Corporation, Charlotte, NC (US)

(*) Notice: Subject to any disclaimer, the term of this patent is extended or adjusted under 35 U.S.C. 154(b) by 218 days.

(21) Appl. No.: 17/900,082

(22) Filed: Aug. 31, 2022

(65) Prior Publication Data
US 2024/0070037 A1 Feb. 29, 2024

(51) Int. Cl.
G06F 11/16 (2006.01)
G06F 9/54 (2006.01)
G06F 11/07 (2006.01)

(52) U.S. Cl.
CPC ............ *G06F 11/16* (2013.01); *G06F 9/54* (2013.01); *G06F 11/079* (2013.01)

(58) Field of Classification Search
CPC .......... G06F 11/16; G06F 9/54; G06F 11/079
See application file for complete search history.

(56) References Cited

U.S. PATENT DOCUMENTS

| | | | |
|---|---|---|---|
| 9,569,288 B2 | 2/2017 | Cui et al. | |
| 9,825,956 B2 | 11/2017 | Kelley et al. | |
| 10,169,220 B2 | 1/2019 | Rajagopalan et al. | |
| 10,489,279 B2 | 11/2019 | Rajagopalan et al. | |
| 10,810,112 B2 | 10/2020 | Rajagopalan et al. | |
| 11,695,567 B2* | 7/2023 | Chan | G06F 16/27 713/176 |
| 2010/0235494 A1* | 9/2010 | Sood | G06F 11/3495 709/224 |
| 2022/0035693 A1* | 2/2022 | Jiang | G06F 11/0751 |
| 2024/0193593 A1* | 6/2024 | Zheng | G06Q 20/02 |

* cited by examiner

*Primary Examiner* — Ryan J Jakovac
(74) *Attorney, Agent, or Firm* — Banner & Witcoff, Ltd.

(57) ABSTRACT

Arrangements for providing API stability functions are provided. In some aspects, call logs may be received and analyzed to identify a provider associated with each API call. Based on the provider, the call logs may be split into one or more provider-specific sub-logs. The provider-specific sub-logs may be analyzed to identify failed API calls and the sub-logs having failed API calls may be encrypted using a provider-specific encryption key. The encrypted data may be written to a blockchain where the provider may decrypt the data using the provider-specific key and identify and execute one or more corrective actions. Once a cause of the API call failure has been addressed, an indication of the correction may be received and displayed.

16 Claims, 11 Drawing Sheets

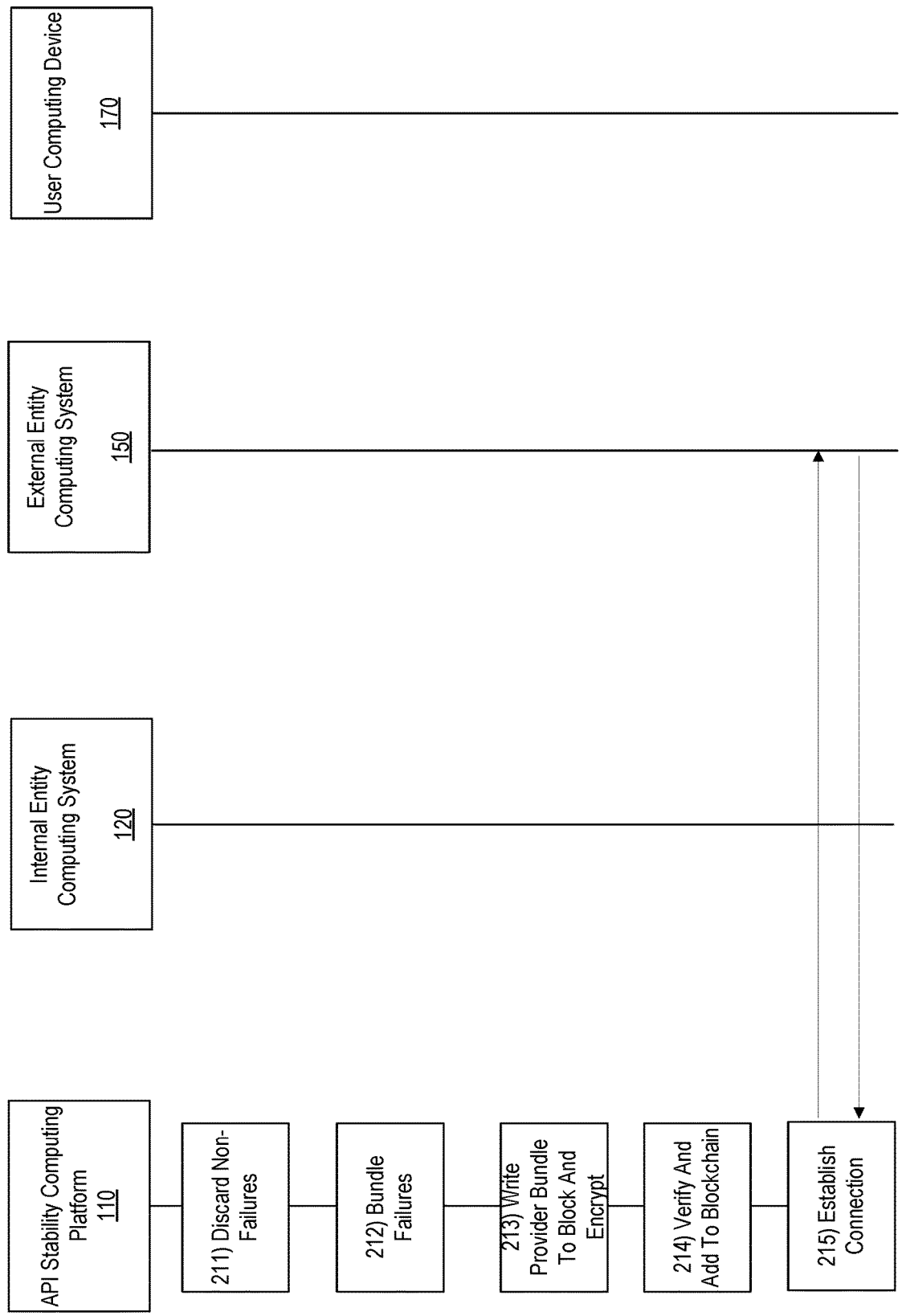

Before Split:
198.123.45.678 - - [28/Jul/2021:05:55:22 +0000] "POST /dsp/document/services/v1 HTTP/1.1" 200 697
198.123.45.678 - - [28/Jul/2021:06:27:54 +0000] "POST /dsp/document/services/v1 HTTP/1.1" 200 348
198.123.45.678 - - [28/Jul/2021:06:33:48 +0000] "OPTIONS /xyz/generate/service/v2 HTTP/1.1" 403 20
198.123.45.678 - - [28/Jul/2021:07:03:00 +0000] "POST /dsp/ document/services/v1 HTTP/1.1" 200 348
198.123.45.678 - - [28/Jul/2021:06:33:48 +0000] "POST /xyz/generate/service/v2 HTTP/1.1" 403 20
198.123.45.678 - - [28/Jul/2021:07:03:00 +0000] "POST /dsp/document/services/v1 HTTP/1.1" 200 348
198.123.45.678 - - [28/Jul/2021:07:38:11 +0000] "POST /dsp/document/services/v1 HTTP/1.1" 200 313

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

After Split:-

Provider xyz –
198.123.45.678 - - [28/Jul/2021:06:33:48 +0000] "OPTIONS /xyz/generate/services/v2 HTTP/1.1" 403 20
198.123.45.678 - - [28/Jul/2021:06:33:48 +0000] "POST /xyz/generate/services/v2 HTTP/1.1" 403 20

Provider dsp –
198.123.45.678 - - [28/Jul/2021:05:55:22 +0000] "POST /dsp/generate/services/v1 HTTP/1.1" 200 697
198.123.45.678 - - [28/Jul/2021:06:27:54 +0000] "POST /dsp/generate/services/v1 HTTP/1.1" 200 348
198.123.45.678 - - [28/Jul/2021:07:03:00 +0000] "POST /dsp/generate/services/v1 HTTP/1.1" 200 348
198.123.45.678 - - [28/Jul/2021:07:03:00 +0000] "POST /dsp/generate/services/v1 HTTP/1.1" 200 348
198.123.45.678 - - [28/Jul/2021:07:38:11 +0000] "POST /dsp/generate/services/v1 HTTP/1.1" 200 313

FIG. 5

MULTI-COMPUTER SYSTEM FOR MAINTAINING APPLICATION PROGRAMMING INTERFACE STABILITY WITH SHARED COMPUTING INFRASTRUCTURE

BACKGROUND

Aspects of the disclosure relate to electrical computers, systems, and devices for providing dynamic application programming interface (API) stability in systems with shared computing infrastructure.

Enterprise organizations employ, execute and host many applications that have various components that may be associated with one or more APIs. In some cases, one when one component fails, system slow downs and, ultimately, system crashes may occur. In conventional arrangements, API calls failures may be manually identified by reviewing call logs to identify the failure, identify the provider associated with the API and inform the provider of the API call failure. This process may be inefficient, particularly when mitigation of an issue may be critical to performance of the system. Accordingly, it may be advantageous to quickly identify failed or failing APIs and transmit provider specific data related to the failed or failing APIs in a secure manner.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with identifying failing application programming interfaces (APIs) communicating API call failures to providers.

In some aspects, call logs may be received. For instance, as users interact with a graphical user interface of an application, one or more APIs associated with the application may be called in order to retrieve data. These calls may be logged, along with a response code indicating whether a call was successful or not. In some examples, the call logs may be analyzed to identify a provider associated with each API call and the call logs may be split into one or more provider-specific sub-logs. The provider-specific sub-logs may be analyzed to identify failed API calls and the sub-logs having failed API calls may be encrypted using a provider-specific encryption key. The encrypted data may be written to a blockchain where the provider may decrypt the data using the provider-specific key and identify and execute one or more corrective actions. Once a cause of the API call failure has been addressed, an indication of the correction may be received and displayed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing API stability functions in accordance with one or more aspects described herein;

FIG. 5 illustrates one example call log before and after being split into provider-specific sub-logs in accordance with one or more aspects described herein.

DETAILED DESCRIPTION

Figure 1A:
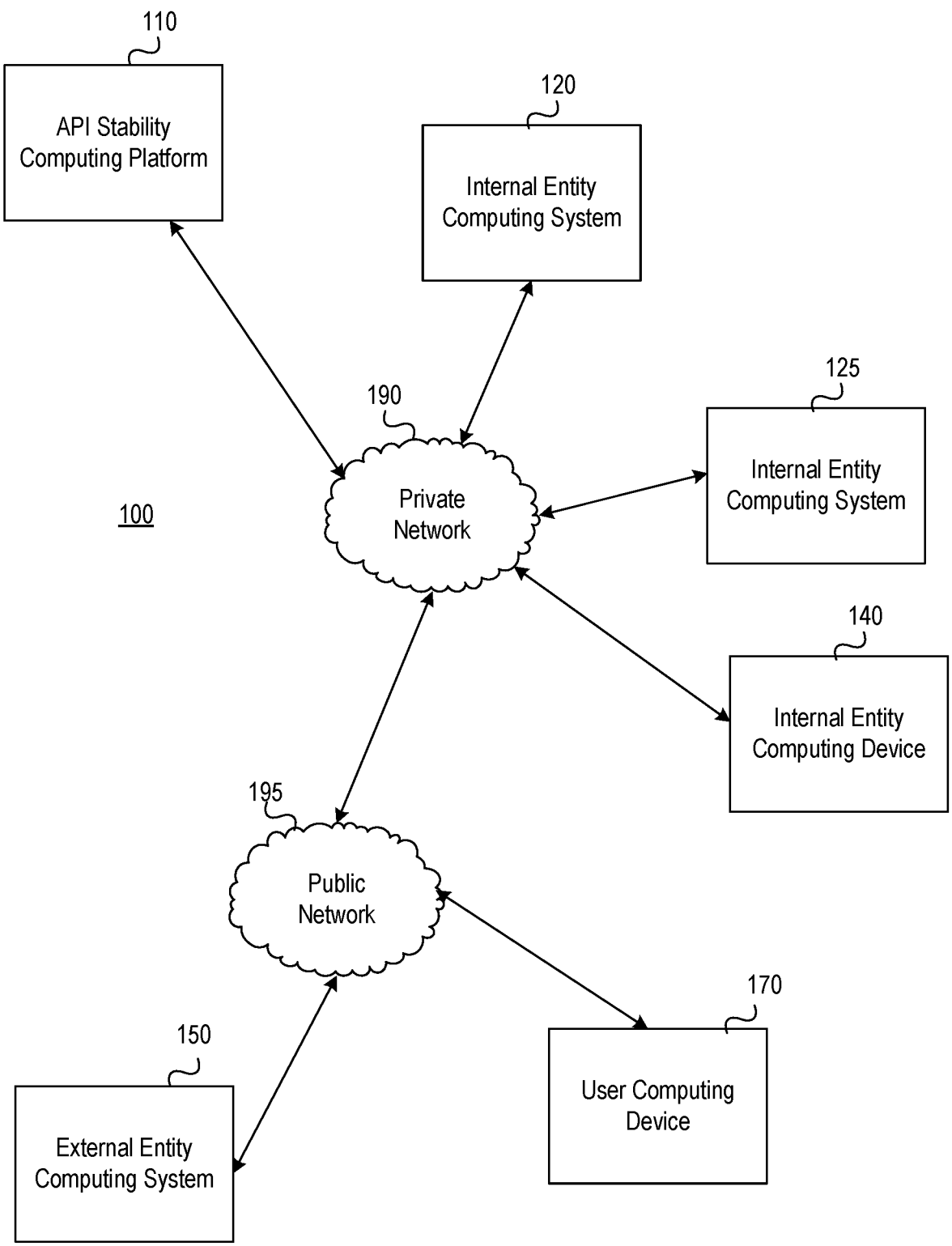
FIGS. 1A and 1B depict an illustrative computing environment for implementing API stability functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, applications may rely on a plurality of application programming interfaces (APIs) to function correctly. However, when one API fails, it may result in extended wait times for a user accessing the application, reallocation of computing resources to the failing API, and, in some examples, failure or crash of the entire application. Accordingly, detecting failing APIs in real-time and working to quickly and efficient address a cause of the failure may aid in maintaining efficient operation and stability of the application.

Accordingly, as discussed more fully herein, call logs from API calls associated with an application may be captured. In some examples, the call logs may be split or partitioned to create a plurality of sub-logs including API calls associated with internal applications and various providers. Accordingly, in some examples, a sub-log may be generated for each provider and the sub-log for the respective provider may include call log data for all API calls associated with that provider (e.g., over a period of time).

In some examples, the sub-logs may be analyzed to determine whether any API call failures are detected. For instance, API call response codes recorded in the call logs may be analyzed to determine whether one or more failure codes are present. If so, call failure data associated with the failed calls, metadata, and the like, may be bundled in a provider-specific bundle. The provider-specific bundle may be encrypted with a key known only to the respective provider and the enterprise organization implementing the system. In some examples, the provider specific bundles are then pushed to a blockchain and, after verification, may be added to the blockchain. For instance, a block may be added including the encrypted provider-specific bundle. The bundle added to the blockchain may then only be accessible to the respective provider who may decrypt the bundled data and analyze the data to determine one or more mitigating actions to address the issue causing the call failure. Once a mitigating or corrective action is implemented, a notification may be transmitted to the enterprise organization indicating resolution of the issue causing the call failures.

These and various other arrangements will be discussed more fully below.

Figure 1B:
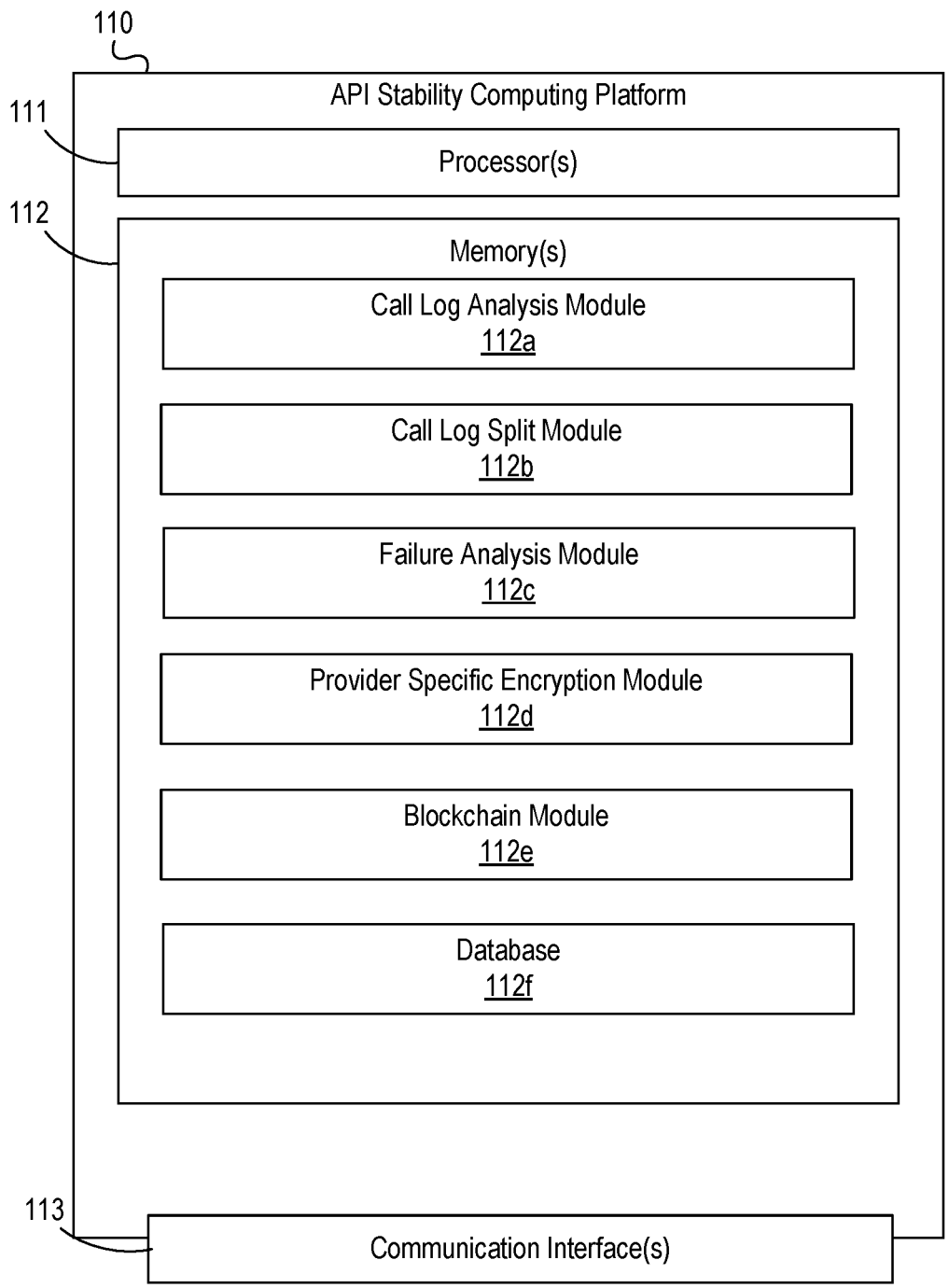

Aspects described herein may be implemented using one or more computing devices operating in a computing environment. For instance, FIGS. 1A-1B depict an illustrative computing environment for implementing API stability functions in accordance with one or more aspects described herein. Referring to FIG. 1A, computing environment 100 may include one or more computing devices and/or other computing systems. For example, computing environment 100 may include API stability computing platform 110, internal entity computing system 120, internal entity computing system 125, internal entity computing device 140, external entity computing system 150, and/or user computing device 170. Although two internal entity computing systems 120, 125 one internal entity computing device 140, one external entity computing system 150 and one user computing device 170, are shown, any number of systems or devices may be used without departing from the invention.

API stability computing platform 110 may be configured to perform intelligent, dynamic, and efficient API call failure detection monitoring and mitigation. In some examples, API stability computing platform 110 may receive call log data associated with a plurality of API calls associated with an application. For instance, API calls logs for a period of time may be received and split or partitioned by provider (e.g., internal, external provider, or the like) to generate one or more sub-logs. In some examples, API stability computing platform 110 may analyze the sub-logs to determine whether one or more call failures occurred (e.g., based on response code data generated in response to one or more API calls). If so, the call log data associated with the failures, metadata associated with the failures, and the like, may be included in a provider-specific data bundle that may be encrypted using a provider-specific encryption key and pushed to a blockchain. In some examples, the blockchain may be accessible to all providers but each provider may only access data or blocks within the blockchain associated with that respective provider (e.g., each provider may only decrypt data associated with that provider).

Once the provider has analyzed the failure data and identified mitigating actions, the issue may be resolved and a resolution notification may be transmitted to the API stability computing platform 110 as well as one or more devices executing the application associated with the failed API calls. Accordingly, API stability computing platform may indicate a resolution to the issue.

Internal entity computing system 120 and/or internal entity computing system 125 may be or include one or more computing systems, devices, or the like, that may host or execute one or more applications of an enterprise organization. For instance, internal entity computing system 120 and/or internal entity computing system 125 may host or execute one or more applications in use by an enterprise organization (e.g., internally during the course of business, externally to provide services to one or more customers, and the like). Accordingly, internal entity computing system 120 and/or internal entity computing system 125 may receive requests for data (e.g., via a user interface layer of a respective application) and may execute one or more APIs to facilitate data requests. Accordingly, as calls to APIs are made, internal entity computing system 120 and/or internal entity computing system 125 may store transaction or call log data including a record of the call, response code associated with the call, and the like. This data may then be analyzed by API stability computing platform 110 to identify failing APIs, efficiently inform providers of the failures, and the like.

Internal entity computing device 140 may be a computing device configured to communicate with API stability computing platform 110. For instance, internal entity computing device 140 may be a computing device associated with a user within the enterprise organization that may investigate failing or failed APIs that do not have a known response code (e.g., for which an automatic response is not executed), work to identify mitigating actions in parallel with the provider (e.g., for most efficient resolution), or the like.

External entity computing system 150 may be or include one or more computing devices (e.g., servers, server blades, or the like) including one or more computing components (e.g., memory, processor, and the like) associated with an entity outside of or external to the enterprise organization. For instance, external entity computing system 150 may be associated with one or more providers associated with data retrieved via an API associated with an application in use by the enterprise organization. Accordingly, external entity computing system 150 may be used to access blockchain and associated provider-specific blockchain data pushed to the blockchain by the API stability computing platform 110.

User computing device 170 may be or include one or more user computing devices (e.g., smart phones, wearable devices, laptops, desktops, tablets, or the like) that may be used (e.g., by an employee of the enterprise organization, by a customer of the enterprise organization, or the like) to display one or more user interfaces associated with an application, receive user input requesting data via the one or more user interface, display requested data and/or associated graphical user interfaces, and the like. In some examples, user interfaces associated with the application and displayed by a display of user computing device 170.

As mentioned above, computing environment 100 also may include one or more networks, which may interconnect one or more of API stability computing platform 110, internal entity computing system 120, internal entity computing system 125, internal entity computing device 140, external entity computing system 150, and/or user computing device 170. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, API stability computing platform 110, internal entity computing system 120, internal entity computing system 125, and/or internal entity computing device 140, may be associated with an enterprise organization (e.g., a financial institution), and private network 190 may be associated with and/or operated by the organization, and may include one or more networks (e.g., LANs, WANs, virtual private networks (VPNs), or the like) that interconnect API stability computing platform 110, internal entity computing system 120, internal entity computing system 125, and/or internal entity computing device 140, and one or more other computing devices and/or computer systems that are used by, operated by, and/or otherwise associated with the organization. Public network 195 may connect private network 190 and/or one or more computing devices connected thereto (e.g., API stability computing platform 110, internal entity computing system 120, internal entity computing system 125, and/or internal entity computing device 140) with one or more networks and/or computing devices that are not associated with the organization. For example, external entity computing system 150 and/or user computing device 170, might not be associated with an organization that operates private network 190 (e.g., because external entity computing system 150 and/or user computing device 170 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that external entity computing system 150 and/or user computing device 170 to private network 190 and/or one or more computing devices connected thereto (e.g., API stability computing platform 110, internal entity computing system 120, internal entity computing system 125, and/or internal entity computing device 140).

Referring to FIG. 1B, API stability computing platform 110 may include one or more processors 111, memory 112, and communication interface 113. A data bus may interconnect processor(s) 111, memory 112, and communication interface 113. Communication interface 113 may be a network interface configured to support communication between API stability computing platform 110 and one or more networks (e.g., private network 190, public network 195, or the like). Memory 112 may include one or more program modules having instructions that when executed by processor(s) 111 cause API stability computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of API stability computing platform 110 and/or by different computing devices that may form and/or otherwise make up API stability computing platform 110.

For example, memory 112 may have, store and/or include call log analysis module 112*a*. Call log analysis module 112*a* may store instructions and/or data that may cause or enable the API stability computing platform 110 to receive transaction or call logs from one or more applications (e.g., internal-facing applications hosted by the enterprise organization, external-facing applications hosted by the enterprise organization, and the like). The call logs may include one or more calls to one or more APIs associated with one or more applications. In some examples, the call logs may include a response code associated with each call to each API. In some arrangements, the response codes may indicate whether the call was successful, whether the call failed, why the call failed (e.g., a reason code associated with the failure), and the like. In some examples, the call logs may be received from a database associated with one or more internal entity computing systems (e.g., internal entity computing system 120, internal entity computing system 125). For instance, the call logs may be stored in a transaction log of a distributed database.

API stability computing platform 110 may further have, store and/or include call log split module 112*b*. Call log split module 112*b* may store instructions and/or data that may cause or enable the API stability computing platform 110 to review and analyze the call logs from one or more applications, sort the calls by provider (e.g., internal, external provider, or the like) and split the call logs into provider specific sub-logs (e.g., sub-logs including a portion of the calls in the analyzed call log and associated with a respective provider). Accordingly, from the analyzed call log one or more provider-specific sub-logs may be generated.

API stability computing platform 110 may further have, store and/or include failure analysis module 112*c*. Failure analysis module 112*c* may store instructions and/or data that may cause or enable the API stability computing platform 110 to evaluate the calls in each sub-log and determine, based on a call response code, whether the response code indicates a call failure. If not, the call may be discarded (e.g., deleted, removed from the sub-log, or the like). If the call indicates a failure, it may remain on the sub-log for further processing. The calls remaining on each sub-log (e.g., failed calls associated with the respective provider) may be bundled (e.g., including any metadata, additional data associated with the failed calls, and the like) in a provider-specific bundle.

API stability computing platform 110 may further have, store and/or include provider-specific encryption module 112*d*. Provider-specific encryption module 112*d* may store instructions and/or data that may cause or enable the API stability computing platform 110 to encrypt each provider-specific bundle with a provider-specific key that enables the respective provider to access the data. The encrypted bundles may then be pushed to blockchain module 112*e* (e.g., blocks added to a blockchain if blocks are valid, if source is valid, and the like). Each respective provider may be able to access the blockchain (e.g., blockchain module 112*e*) and may retrieve and decrypt data stored on the blockchain using provider-specific decryption (e.g., based on provider-specific key).

API stability computing platform 110 may further have, store and/or include a database 112*f*. Database 112*f* may store data associated with call logs, provider data, call failure remediation data, and the like.

FIGS. 2A-2E depict one example illustrative event sequence for implementing API stability functions in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
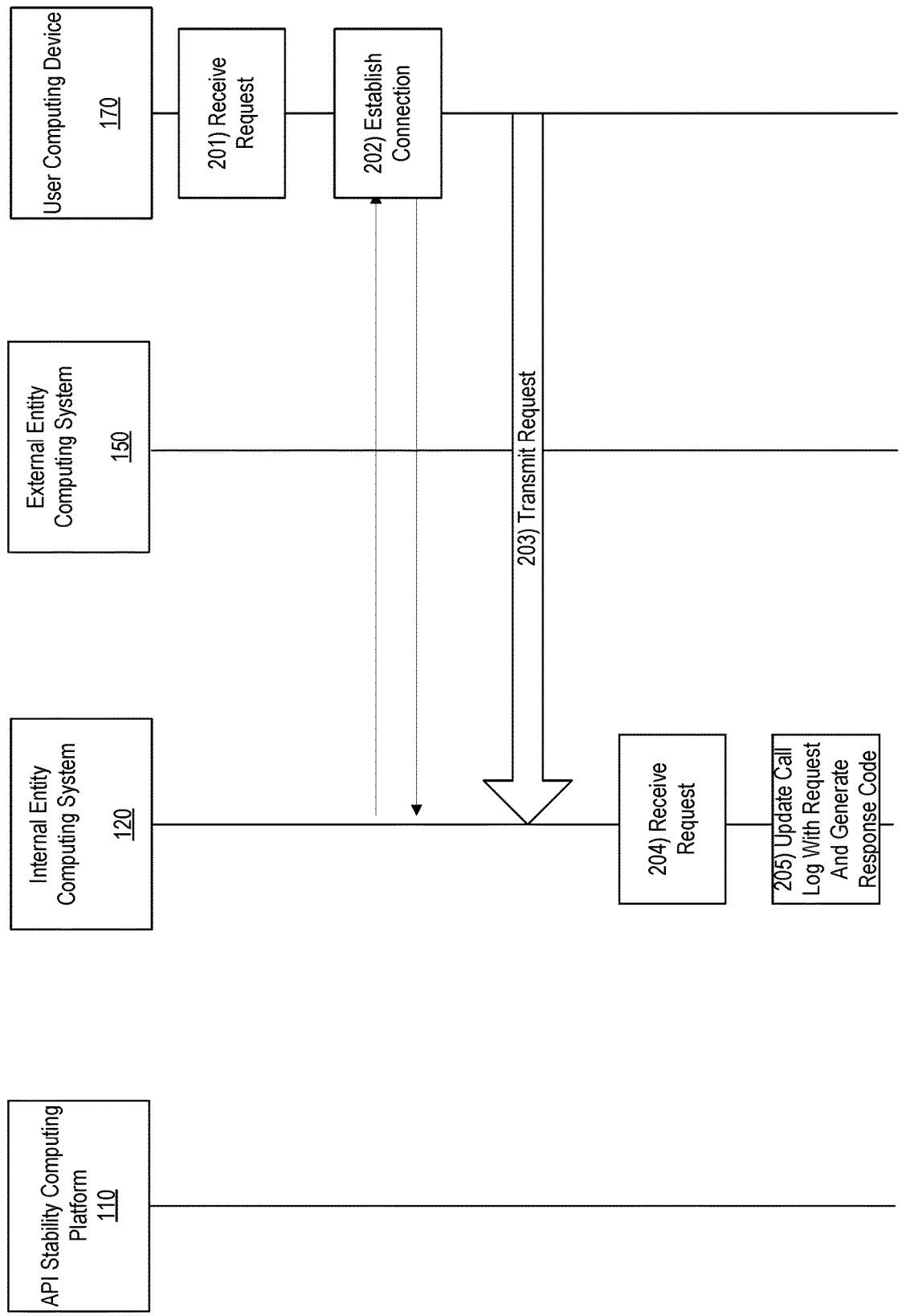

With reference to FIG. 2A, at step 201, user computing device 170 may receive a request to access data via, for instance, a graphical user interface displayed by a display of the user computing device 170 and associated with an application hosted by an enterprise organization (e.g., by internal entity computing system 120). For instance, the user may select an option available via the graphical user interface to request data.

At step 202, user computing device 170 may connect to internal entity computing system 120. For instance, a first wireless connection may be established between user computing device 170 and internal entity computing system 120. Upon establishing the first wireless connection, a communication session may be initiated between user computing device 170 and internal entity computing system 120. In some examples, user computing device 170 may determine that a connection already exists. If so, an additional connection might not be established.

At step 203, the user computing device 170 may send or transmit the request for data to the internal entity computing system 120. For instance, the request for data may be transmitted during the communication session initiated upon establishing the first wireless connection.

At step 204, internal entity computing system 120 may receive the request transmitted at step 203 and may process or execute the request.

Responsive to processing or executing the request, at step 205, a call log may be updated to include the request for data (e.g., one or more calls to one or more APIs associated with the application and the requested data) and one or more generated response codes associated with the calls.

Figure 2B:
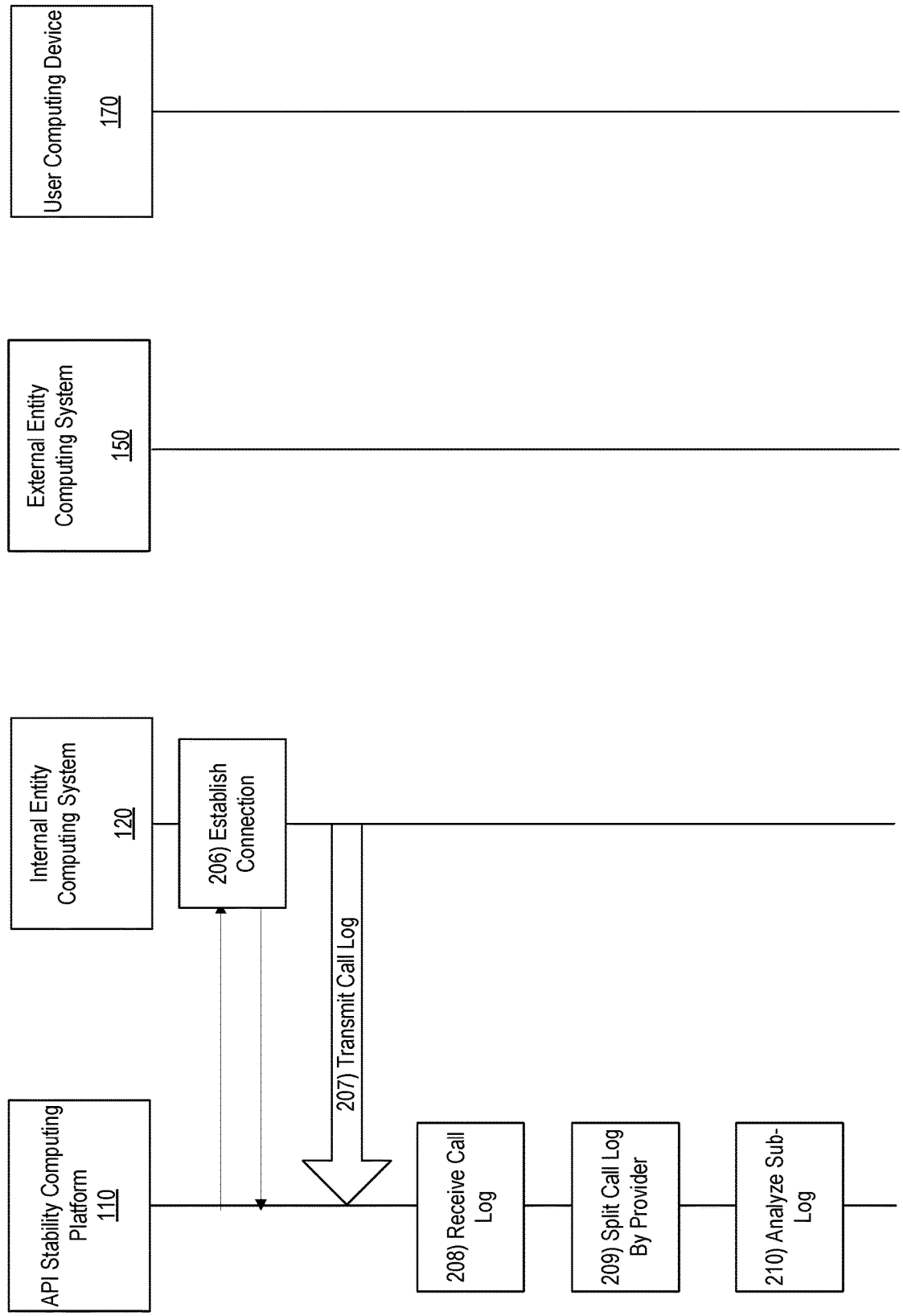

With reference to FIG. 2B, at step 206, internal entity computing system 120 may connect to API stability computing platform 110. For instance, a second wireless connection may be established between internal entity computing system 120 and API stability computing platform 110. Upon establishing the second wireless connection, a communication session may be initiated between internal entity computing system 120 and API stability computing platform 110. In some examples, internal entity computing system 120 may determine that a connection already exists. If so, an additional connection might not be established.

At step 207, the internal entity computing system 120 may transmit the call log to the API stability computing platform 110. For instance, the call log may be transmitted during the communication session initiated upon establishing the second wireless connection.

At step 208, API stability computing platform 110 may receive the call log transmitted at step 207.

At step 209, the API stability computing platform 110 may analyze the call log to split the call log by providers associated with each API in the call log. For instance, one or more sub-logs may be generated by sorting the call log by provider associated with each API and splitting the sorted call log to generate a sub-log associated with each provider and including API calls for the respective provider. In some examples, each sub-log may include only API call associated with the respective provider.

At step 210, one or more of the sub-logs may be analyzed to determine whether one or more calls on a respective sub-log indicates a call failure. For instance, response codes associated with one or more calls on each sub-log may be evaluated to determine whether the response code indicates a failed API call. If not, the call data (e.g., call instance on the sub-log) may be discarded (e.g., deleted or otherwise removed from the provider-specific sub-log) at step 211 in FIG. 2C.

With further reference to FIG. 2C, if one or more response codes indicate a call failure on the sub-log, the calls identified as failures may be bundled with additional data (e.g., additional call data, metadata, and the like) in a provider-specific bundle at step 212. Accordingly, in some examples, for each provider-specific sub-log having at least one call failure, a provider-specific bundle may be generated.

At step 213, the provider-specific bundle may be encrypted and written to a blockchain block. For instance, the provider-specific bundle may be encrypted using a provider-specific key (e.g., a consensus key) that may enable the provider to access the encrypted data via the blockchain.

At step 214, the block may be validated and added to the blockchain. Accordingly, while the blockchain may be accessible to the enterprise organization and one or more (or all) providers, data may only be accessed by a provider associated with the data and having the provider-specific encryption key.

At step 215, API stability computing platform 110 may connect to external entity computing system 150. For instance, a third wireless connection may be established between API stability computing platform 110 and external entity computing system 150. Upon establishing the third wireless connection, a communication session may be initiated between API stability computing platform 110 and external entity computing system 150.

Figure 2D:
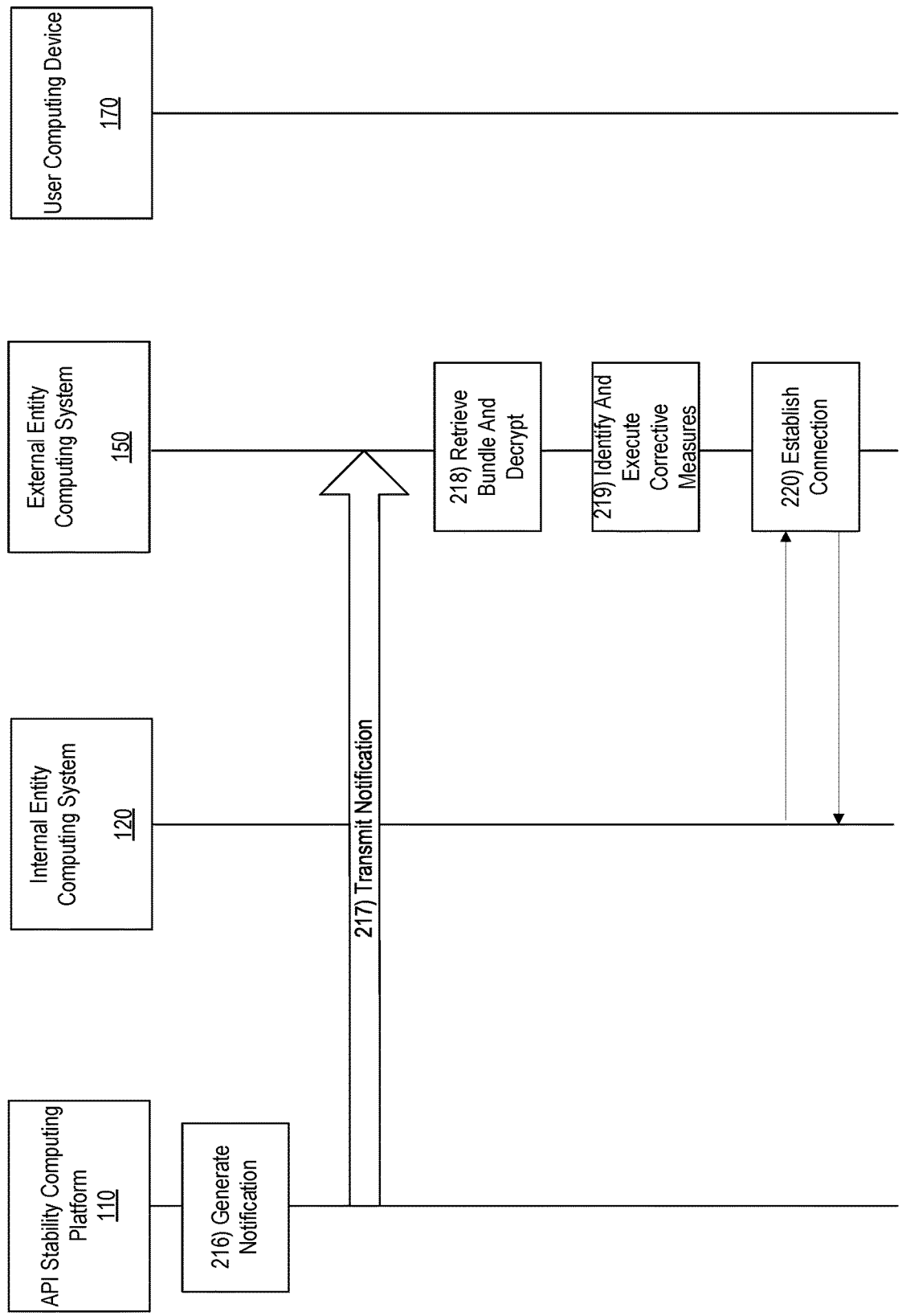

With reference to FIG. 2D, at step 216, API stability computing platform 110 may generate a notification indicating that a provider-specific bundle including call log failures has been written to the blockchain. At step 217, the API stability computing platform 110 may transmit or send the notification to the external entity computing system 150. In some examples, the notification may be transmitted or sent during the communication session initiated upon establishing the third wireless connection.

At step 218, external entity computing system 150 may receive the notification and retrieve the provider-specific data from the blockchain. External entity computing system 150 may further decrypt the encrypted data using the provider-specific key.

At step 219, external entity computing system 150 may analyze the decrypted data associated with the one or more failed API calls and may identify and execute one or more corrective measures. In some examples, executing corrective measures may be include modifying one or more systems, devices, applications, or the like, executing on or hosted by the external entity. Additionally or alternatively, executing one or more corrective measures may include transmitting data (e.g., instructions associated with the one or more corrective measures) to one or more other computing systems, such as internal entity computing system 120.

At step 220, external entity computing system 150 may connect to internal entity computing system 120. For instance, a fourth wireless connection may be established between external entity computing system 150 and internal entity computing system 120. Upon establishing the fourth wireless connection, a communication session may be initiated between external entity computing system 150 and internal entity computing system 120.

Figure 2E:
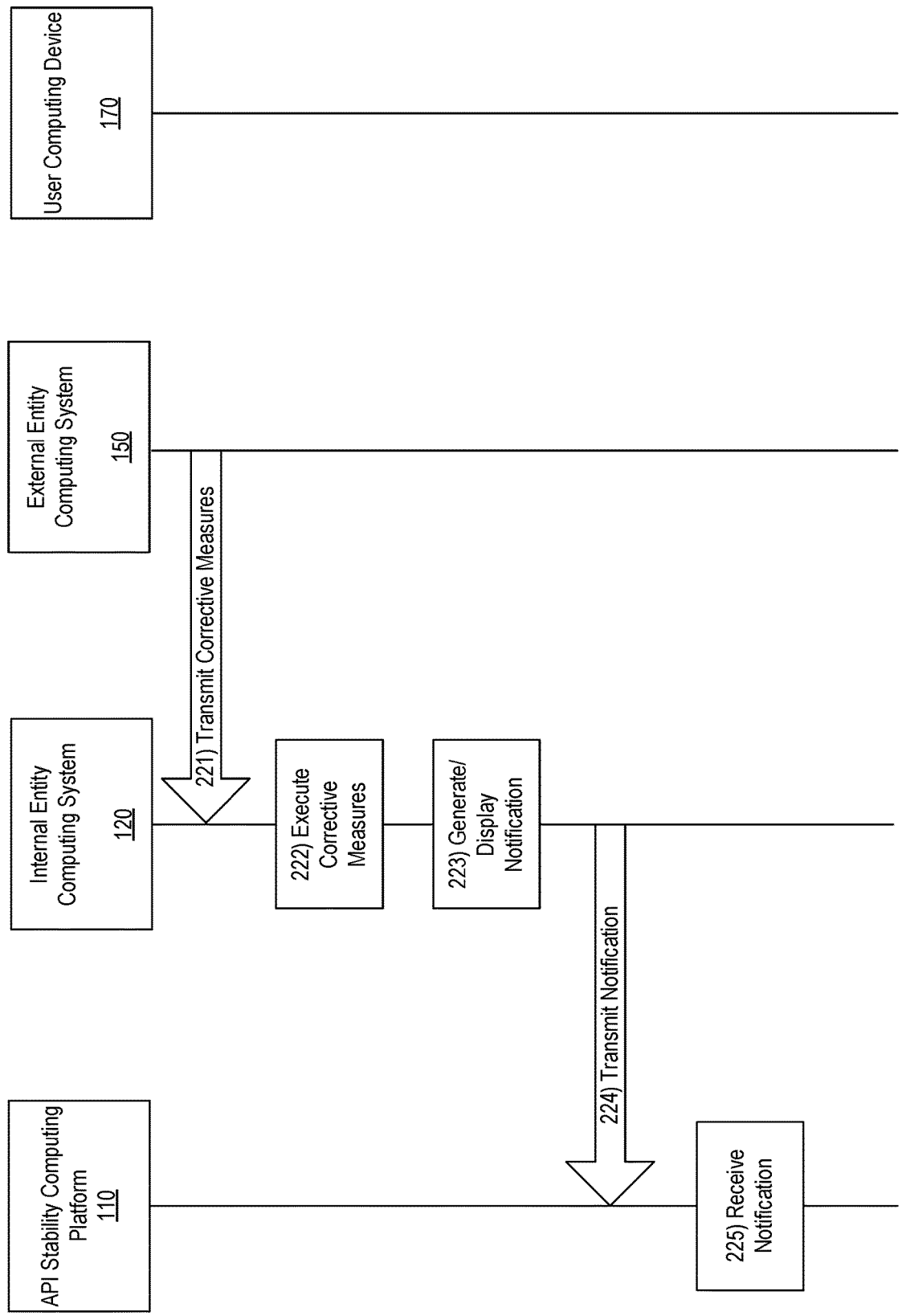

With reference to FIG. 2E, at step 221, external entity computing system 150 may transmit or send one or more corrective measures, or notification of corrective measures, to internal entity computing system 120. For instance, the one or more corrective measures, or notification, may be transmitted during the communication session initiated upon establishing the fourth wireless connection.

At step 222, internal entity computing system 120 may receive and execute the one or more corrective measures.

Figure 4:
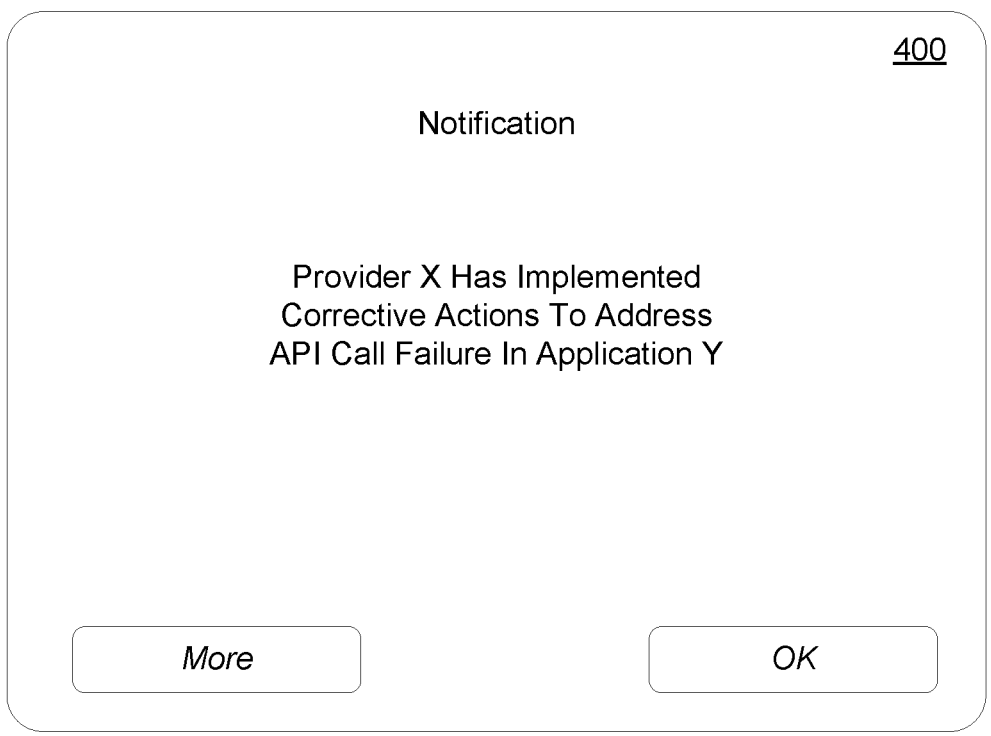
FIG. 4 illustrates one example user interface that may be generated in accordance with one or more aspects described herein.

At step 223, a notification indicating that corrective measures have been implemented or executed may be generated and/or displayed by the internal entity computing system 120. For instance, FIG. 4 illustrates one example user interface 400 including an indication that a provider has taken corrective actions to address API call failures in a particular application.

At step 224, the internal entity computing system 120 may transmit or send the notification to the API stability computing platform 110. At step 225, API stability computing platform 110 may receive the notification.

Figure 3:
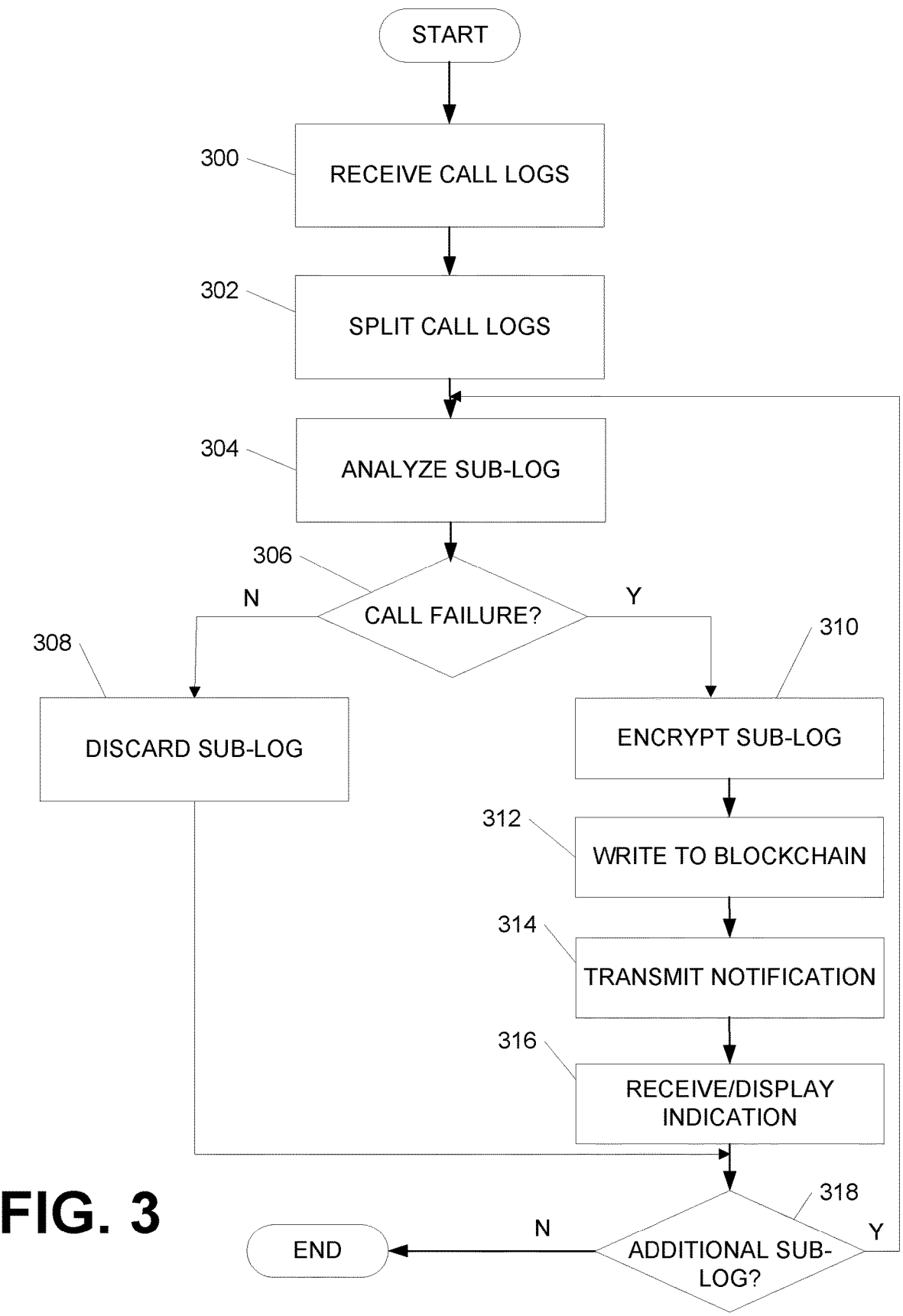
FIG. 3 illustrates an illustrative method for implementing API stability functions according to one or more aspects described herein.

FIG. 3 is a flow chart illustrating one example method of implementing API stability functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, call logs may be received from one or more computing devices or systems hosting one or more applications, the one or more applications having a plurality of APIs associated therewith from a plurality of providers. For instance, call logs including calls made to APIs associated with the one or more applications and one or more providers, as well as response codes generated based on the calls made may be received. In some examples, the call logs may include a record of each call to each API and a response code generated for each call to each API. The response code may indicate whether the call was successful or a failure.

At step 302, the received call log may be split into one or more sub-logs based on the provider associated with the API. For instance, the call logs may be analyzed to determine a provider associated with each API or API call and the call logs may be split into one or more smaller, sub-logs with each sub-log being associated with a different, respective provider. Accordingly, if the call logs include calls to API's associated with three different providers (e.g., Provider A, Provider B, Provider C), the call logs may be split into three sub-logs, one associated with APIs of Provider A, one associated with APIs of Provider B and one associated with APIs of Provider C.

At step 304, a first sub-log associated with a first provider may be analyzed to determine whether at least one API call failure is identified within the first sub-log. For instance, response codes associated with each call in the first sub-log may be evaluated to determine whether the response code indicates a failure.

At step 306, if at least one call failure is not identified in the first sub-log, the sub-log may be discarded (e.g., deleted) at step 308 and the process may continue to step 318 to determine whether additional sub-logs are available for evaluation. If so, the process may return to step 304 to analyze another sub-log (e.g., a second sub-log associated with a second provider different from the first provider).

If, at step 306, at least one call failure is identified, at step 310, the first sub-log may be encrypted. In some examples, the first sub-log may be encrypted using a provider-specific consensus key agreed to by the provider associated with the first sub-log (e.g., the first provider) and the enterprise organization. Accordingly, the enterprise organization may encrypt the first sub-log using the provider-specific encryption key. In some examples, the first sub-log may be bundled with additional API call data (e.g., metadata, and the like) prior to encryption and the bundled data (e.g., first sub-log and metadata) may be encrypted using the provider-specific key.

In some examples, only API calls in the first sub-log indicating a call failure may be encrypted. For instance, in some examples, API calls in the first sub-log that do not include response codes indicating an API call failure may be removed (e.g., deleted) from the first sub-log such that the first sub-log only includes API calls including response codes indicating a call failure.

At step 312, the encrypted data may be written to a blockchain (e.g., a block including the encrypted first sub-log or bundled data may be created and added to the blockchain). In some examples, the blockchain may be accessible to all providers of the plurality of providers but providers may only access data associated with the respective provider (e.g., providers may only decrypt data encrypted using that provider's provider-specific encryption key).

At step 314, a notification may be transmitted to the provider associated with the encrypted data indicating that API call failure data has been written to the blockchain. For instance, a notification may be transmitted to the first provider indicating that API call failure data has been written to the blockchain. The notification may be transmitted to an external entity computing system associated with the first provider. The external entity computing system may then decrypt the provider-specific data from the blockchain using the provider-specific encryption key, analyze the failure data and identify one or more corrective measures to implement. The external entity computing system may then generate an indication that corrective measures have been implemented to address a cause of the API call failure.

At step 316, the indication that the cause of the API call failure has been addressed may be received and displayed.

At step 318, a determination may be made as to whether additional sub-logs are available for analysis. If so, the process may return to step 304 to analyze another sub-log (e.g., a second sub-log associated with the second provider). If not, the process may end.

FIG. 5 illustrates an example call log before a provider-specific split and after in accordance with one or more arrangements described herein. As shown, the call log data before the split includes API calls associated with two provider, provider xyz and provider dsp. In addition, each call includes a response code 502 that may indicate a failure of the API call. Accordingly, after the split, the call log is split into two sub-logs, one for provider xyz and including only calls associated with provider xyz, and one for provider dsp and including only calls for provider dsp. The sub-logs may then be analyzed to identify failures, encrypted and failure data sent to a respective provider via the blockchain, as discussed herein.

Accordingly, arrangements provided herein provide efficient and accurate reporting of API call failures to providers for mitigation. By using provider-specific encryption to provide access to data via a blockchain, the system may securely and efficiently transmit API call failure data, metadata, and the like. Further, because all provider specific failure data may be provided in a bundle, the provider may efficiently receive and begin mitigation of issues associated with the failures. Once mitigation or remediation is complete, a notification may be sent to the enterprise organization to ensure seamless operation of the application.

The arrangements discussed herein may be performed in real-time or near real-time (e.g., call logs may be continuously monitored, split, sub-logs analyzed, and the like) to ensure efficient identification of failures and transmission of failure data to providers via the blockchain. Further, by splitting the call logs by provider and providing, in at least some examples, only API call failure data to the provider, computing resources may be conserved and data may be narrowly focused on only APIs requiring issue mitigation.

In some examples, each provider may have a dashboard provided on the provider computing system that may receive and display notifications of data written to the blockchain, enable access to the blockchain data, and the like. This may aid in quickly identifying corrective actions to address failures and may enable the provider to communicate corrective actions to the enterprise organization.

Figure 6:
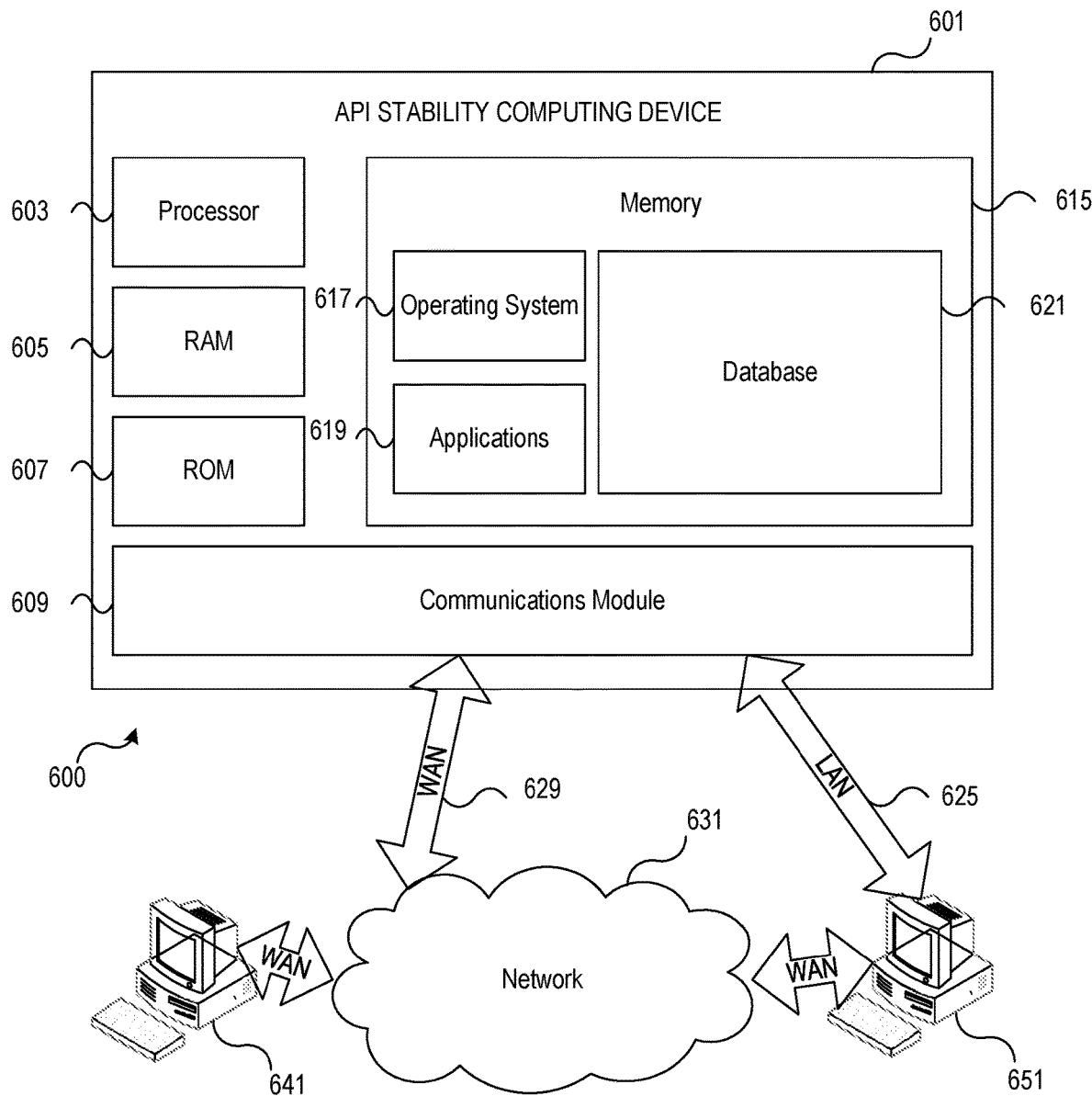
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include API stability computing device 601 having processor 603 for controlling overall operation of API stability computing device 601 and its associated components, including Random Access Memory (RAM) 605, Read-Only Memory (ROM) 607, communications module 609, and memory 615. API stability computing device 601 may include a variety of computer readable media. Computer readable media may be any available media that may be accessed by API stability computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by API stability computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on API stability computing device 601. Such a processor may execute computer-executable instructions stored on a computer-readable medium.

Software may be stored within memory 615 and/or storage to provide instructions to processor 603 for enabling API stability computing device 601 to perform various functions as discussed herein. For example, memory 615 may store software used by API stability computing device 601, such as operating system 617, application programs 619, and associated database 621. Also, some or all of the computer executable instructions for API stability computing device 601 may be embodied in hardware or firmware. Although not shown, RAM 605 may include one or more applications representing the application data stored in RAM 605 while API stability computing device 601 is on and corresponding software applications (e.g., software tasks) are running on API stability computing device 601.

Communications module 609 may include a microphone, keypad, touch screen, and/or stylus through which a user of API stability computing device 601 may provide input, and may also include one or more of a speaker for providing audio output and a video display device for providing textual, audiovisual and/or graphical output. Computing system environment 600 may also include optical scanners (not shown).

API stability computing device 601 may operate in a networked environment supporting connections to one or more remote computing devices, such as computing devices 641 and 651. Computing devices 641 and 651 may be personal computing devices or servers that include any or all of the elements described above relative to API stability computing device 601.

The network connections depicted in FIG. 6 may include Local Area Network (LAN) 625 and Wide Area Network (WAN) 629, as well as other networks. When used in a LAN networking environment, API stability computing device 601 may be connected to LAN 625 through a network interface or adapter in communications module 609. When used in a WAN networking environment, API stability computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and
    a memory storing computer-readable instructions that, when executed by the at least one processor, cause the computing platform to:
        receive a call log associated with application programming interface (API) calls associated with an application, the application including a plurality of application programming interfaces, each API of the plurality of APIs being associated with a provider of a plurality of providers;
        analyze the call log to identify API calls associated with each provider of the plurality of providers;
        split the call log to generate a plurality of sub-logs, wherein each sub-log is associated with a provider of the plurality of providers, the sub-log including a portion of the API calls in the analyzed call log and associated with a respective provider;
        for a first sub-log for a first provider:
            analyze each call in the first sub-log to determine whether at least one API call failure is identified;
            responsive to determining that at least one API call failure is not identified, discarding the first sub-log associated with the first provider;
            responsive to determining that at least one API call failure is identified:
                bundle all API call failures in the first sub-log with metadata associated with each API call failure in the first sub-log in a provider-specific bundle specific to the first provider;
                encrypt the provider-specific bundle specific to the first provider using an encryption key specific to the first provider;
                create a block of a blockchain including the encrypted first provider-specific bundle specific to the first provider;
                transmit a notification to the first provider indicating that the provider-specific bundle has been added to the blockchain;
                receive, from the first provider, an indication of correction of an issue that caused the at least one API call failure, wherein the indication of correction of the issue includes an indication of an executed modification to a system or application hosted by the first provider; and
                display a notification including the indication.

2. The computing platform of claim 1, wherein the indication of correction of the issue that caused the at least one API call failure is generated by an external entity computing system of the first provider.

3. The computing platform of claim 2, wherein the external entity computing system of the first provider is configured to retrieve the encrypted provider-specific bundle and decrypt the encrypted provider-specific bundle using the encryption key specific to the first provider.

4. The computing platform of claim 1, wherein the blockchain is accessible to the plurality of providers and each provider of the plurality of providers has access to only sub-log data associated with a respective provider.

5. The computing platform of claim 1, wherein analyzing each call in the first sub-log to determine whether at least one API call failure is identified includes analyzing a response code generated for each API call in the first sub-log.

6. The computing platform of claim 1, further including instructions that, when executed, cause the computing platform to:
    prior to encrypting the provider-specific bundle specific to the first provider using an encryption key specific to the first provider, removing, from the first sub-log, all API calls not identified as an API call failure in the first sub-log.

7. The computing platform of claim 1, wherein discarding the first sub-log associated with the first provider includes deleting the first sub-log.

8. The computing platform of claim 1, further including instructions that, when executed, cause the computing platform to:
    for a second sub-log for a second provider different from the first provider:

analyze each call in the second sub-log to determine whether at least one API call failure is identified;
responsive to determining that at least one API call failure is not identified, discarding the second sub-log associated with the second provider;
responsive to determining that at least one API call failure is identified:
bundle all API call failures in the second sub-log with metadata associated with each API call failure in the second sub-log in a second provider-specific bundle specific to the second provider;
encrypt the second provider-specific bundle specific to the second provider using an encryption key specific to the second provider;
create a block of a blockchain including the encrypted second provider-specific bundle;
transmit a notification to the second provider indicating that the second provider-specific bundle has been added to the blockchain;
receive, from the second provider, an indication of correction of an issue that caused the at least one API call failure; and
display a notification including the indication.

9. A method, comprising:
receiving, by a computing device, the computing device having at least one processor, and memory, a call log associated with application programming interface (API) calls associated with an application, the application including a plurality of application programming interfaces, each API of the plurality of APIs being associated with a provider of a plurality of providers;
analyzing, by the at least one processor, the call log to identify API calls associated with each provider of the plurality of providers;
splitting, by the at least one processor, the call log to generate a plurality of sub-logs, wherein each sub-log is associated with a provider of the plurality of providers, the sub-log including a portion of the calls in the analyzed call log and associated with a respective provider;
for a first sub-log for a first provider:
analyzing, by the at least one processor, each call in the first sub-log to determine whether at least one API call failure is identified;
when it is determined that at least one API call failure is not identified, discarding, by the at least one processor, the first sub-log associated with the first provider;
when it is determined that at least one API call failure is identified:
bundling, by the at least one processor, all API call failures in the first sub-log with metadata associated with each API call failure in the first sub-log in a provider-specific bundle specific to the first provider;
encrypting, by the at least one processor, the provider-specific bundle specific to the first provider using an encryption key specific to the first provider;
creating, by the at least one processor, a block of a blockchain including the encrypted provider-specific bundle specific to the first provider;
transmitting, by the at least one processor, a notification to the first provider indicating that the provider-specific bundle has been added to the blockchain;
receiving, by the at least one processor and from the first provider, an indication of correction of an issue that caused the at least one API call failure, wherein the indication of correction of the issue includes an indication of an executed modification to a system or application hosted by the first provider; and
displaying, by the at least one processor, a notification including the indication.

10. The method of claim 9, wherein an external entity computing system of the first provider is configured to retrieve the encrypted first provider-specific bundle and decrypt the encrypted provider-specific bundle using the encryption key specific to the first provider.

11. The method of claim 9, wherein the blockchain is accessible to the plurality of providers and each provider of the plurality of providers has access to only sub-log data associated with a respective provider.

12. The method of claim 9, wherein analyzing each call in the first sub-log to determine whether at least one API call failure is identified includes analyzing a response code generated for each API call in the first sub-log.

13. The method of claim 9, further including:
prior to encrypting the provider-specific bundle using an encryption key specific to the first provider, removing, from the first sub-log and by the at least one processor, all API calls not identified as an API call failure in the first sub-log.

14. One or more non-transitory computer-readable media storing instructions that, when executed by a computing platform comprising at least one processor, memory, and a communication interface, cause the computing platform to:
receive a call log associated with application programming interface (API) calls associated with an application, the application including a plurality of application programming interfaces, each API of the plurality of APIs being associated with a provider of a plurality of providers;
analyze the call log to identify API calls associated with each provider of the plurality of providers;
split the call log to generate a plurality of sub-logs, wherein each sub-log is associated with a provider of the plurality of providers, the sub-log including a portion of the calls in the analyzed call log and associated with a respective provider;
for a first sub-log for a first provider:
analyze each call in the first sub-log to determine whether at least one API call failure is identified;
responsive to determining that at least one API call failure is not identified, discarding the first sub-log associated with the first provider;
responsive to determining that at least one API call failure is identified:
bundle all API call failures in the first sub-log with metadata associated with each API call failure in the first sub-log in a provider-specific bundle specific to the first provider;
encrypt the provider-specific bundle specific to the first provider using an encryption key specific to the first provider;
create a block of a blockchain including the encrypted provider-specific bundle specific to the first provider;
transmit a notification to the first provider indicating that the provider-specific bundle has been added to the blockchain;

receive, from the first provider, an indication of correction of an issue that caused the at least one API call failure, wherein the indication of correction of the issue includes an indication of an executed modification to a system or application hosted by the first provider; and display a notification including the indication.

15. The one or more non-transitory computer-readable media of claim 14, wherein analyzing each call in the first sub-log to determine whether at least one API call failure is identified includes analyzing a response code generated for each API call in the first sub-log.

16. The computing platform of claim 1, further including instructions that, when executed, cause the computing platform to:

prior to splitting the call log to generate the plurality of sub-logs, sorting the call log by provider.

\* \* \* \* \*